United States Patent [19]
Butterworth

[11] 3,958,023
[45] May 18, 1976

[54] INCREASING THE CHILL HAZE STABILITY OF AQUEOUS LIQUIDS DERIVED FROM FRUITS AND VEGETABLES

[75] Inventor: Elbert Roy Butterworth, Littleton, Colo.

[73] Assignee: Johns-Manville Corporation, Denver, Colo.

[22] Filed: Oct. 16, 1974

[21] Appl. No.: 515,286

[52] U.S. Cl. .................................. 426/271; 210/75; 426/330.4; 426/330.5; 426/423; 426/495
[51] Int. Cl.$^2$ ...................... C12H 1/04; C12H 1/10
[58] Field of Search .......... 426/271, 330, 422, 423, 426/16, 11, 12, 490, 495, 3 CS, 330.3, 330.4, 330.5; 210/75

[56] References Cited
UNITED STATES PATENTS

| | | | |
|---|---|---|---|
| 2,367,557 | 1/1945 | Atwood | 210/75 X |
| 2,416,007 | 2/1947 | Joachim | 426/365 |
| 2,859,117 | 11/1958 | Braus et al. | 426/422 |
| 2,919,193 | 12/1959 | Berntsson | 426/330 |
| 2,939,791 | 6/1960 | McFarlane | 426/330 |
| 3,117,004 | 1/1964 | McFarlane et al. | 426/330 X |
| 3,128,189 | 4/1964 | Watts et al. | 426/422 X |
| 3,146,107 | 8/1964 | Elder et al. | 426/330 |
| 3,163,537 | 12/1964 | McAdam et al. | 426/330 |
| 3,227,650 | 1/1966 | Bell | 210/75 X |
| 3,352,424 | 11/1967 | Guebert et al. | 210/75 X |
| 3,355,297 | 11/1967 | Stowell | 426/330 |

FOREIGN PATENTS OR APPLICATIONS

| | | | |
|---|---|---|---|
| 7,132,058 | 12/1968 | Japan | 210/75 |
| 736,565 | 9/1955 | United Kingdom | 426/330 |

*Primary Examiner*—S. Leon Bashore
*Assistant Examiner*—Kenneth M. Schor
*Attorney, Agent, or Firm*—Robert M. Krone; Joseph J. Kelly; James W. McClain

[57] ABSTRACT

The present invention provides an improved process for increasing the chill haze stability of aqueous liquids derived from fruits and vegetables, (e.g., beer, wine, fruit juices, vinegar, etc.) by using one or more haze control agents in a precoat or after precoat layer in the filter media used to filter the liquid and by adding one or more haze control agents as a body feed upstream of the filter. In a preferred embodiment one or more haze control agents are also added in ruh storage at a time in the process significantly before the filtration step. This improved process permits the beverage to be packaged immediately after filtration, thus eliminating the time consuming and space consuming storage following filtration normally required by conventional chill haze control techniques.

6 Claims, No Drawings

INCREASING THE CHILL HAZE STABILITY OF AQUEOUS LIQUIDS DERIVED FROM FRUITS AND VEGETABLES

BACKGROUND OF THE INVENTION

This invention pertains to a process of increasing the chill haze stability in aqueous liquids derived from vegetables and fruits. In particular, it relates to the addition of conventional chill haze control agents at particular locations and at particular times in the brewing process.

Various liquids derived from vegetables and fruits contain various phenolic substances, such as tannins and anthycyanogens, proteins, and compounds or complexes of two or more of these substances. Certain molecular weight compounds of the type just described are essential if the liquid is to be sold as a beverage because they contribute to such important characteristics of the beverage as flavor, aroma, foaming, etc. When the liquid is a beer or other beverage, some of the highest molecular weight molecules of the above described compounds are removed by conventional filtration used in the brewing process. However, other relatively high molecular weight compounds which escape filtration can combine after bottling, and before the product is used, to form complex molecules that cause a haze to form in the beverage, particularly when the beverage is chilled. This haze is called chill haze and is an undesirable characteristic in any beverage.

It is well known in the art to treat beverages derived from vegetables or fruits with conventional absorbents or coagulants to adsorb, or coagulate and precipitate, the undesirable tannis, proteins, or combinations thereof from the beverage before the beverage is bottled. In a conventional process, such as that described in U.S. Pat. No. 2,416,007, ruh beer is preferably filtered prior to the addition of the adsorbent and/or coagulating or flocculating agent, the adsorbent and/or coagulating or flocculating agent or agents are then added to the filtered beer, allowed to rest for various periods of time, and then the beer is again filtered to remove these agents before packaging. This dual filtration requirement is undesirable from the standpoint of higher processing costs and a greater amount of filtration and related equipment required.

In another known technique of stabilizing a beverage, such as beer, against the formation of chill haze in the packaged product, enzymes are added to filtered ruh beer, the beer containing the enzymes is allowed to rest in storage under controlled conditions for various periods of time, (e.g., five full days) after which the beer must again be filtered before being packaged. A typical process of this type is disclosed in U.S. Pat. No. 3,100,707. Such processes require at least two filtration steps and it would be desirable, for the reasons stated above, to eliminate one of these filtration steps.

BRIEF SUMMARY OF THE INVENTION

Accordingly, the present invention provides a process for stabilizing aqueous liquids derived from fruits and/or vegetables, such as beer, against the formation of chill haze by treating the beverage, or its precursor, with one or more conventional chill haze control agents prior to and during primary filtration, e.g. filtration of a ruh beer. The stabilizing process of the present invention does not require a second filtration step as do conventional prior art processes.

In the process of the present invention, conventional chill haze control agents can be included in a precoat or after precoat layer on the filter bed and are also added as body feed upstream of the filter. An after precoat layer is the outermost precoat layer on a filter medium. In a preferred embodiment of the present invention, which involves stabilizing beer, one or more haze control agents are also added in ruh storage and allowed to be in contact with the ruh for a significant period of time prior to filtration. The preferred embodiment does not add any additional processing time to conventional brewing processes because the ruh is normally stored for periods of time longer than that required by the present process for contact with the chill haze control agents.

DETAILED DESCRIPTION AND PREFERRED EMBODIMENTS

Although the present invention is applicable to any liquid derived from vegetables and/or fruits that is subject to haze formation caused by the formation of complex molecules of proteins and/or tannins, it is most useful in the manufacture of beer. In a typical process for the manufacture of beer an aqueous extract from suitable grain is fermented to produce ruh. After fermentation has been completed the ruh is transferred into large containers, called ruh storage tanks, where it is allowed to rest or age, typically for periods of time ranging from about five days to three months and typically at temperatures of about 30° to 32° F. During the initial portion or ruh storage at least three different additional treatments may be practiced. First, a gelatin or equivalent material can be added to cause coagulation or flocculation of the byproducts of fermentation, thus accelerating the desired settling of undesirable particles. Also, krausening may be practiced wherein a small amount of yeast is added to the ruh to cause secondary fermentation. Finally, the ruh can be washed with a gas such as carbon dioxide. Upon completion of ruh storage the ruh is decanted from the storage tank in such a manner as to minimize the transfer of any particulate matter which settled out of the ruh during storage onto the bottom of the storage container, i.e., the trub layer. The decanted ruh is passed through a filter, e.g., a layer or bed of diatomite, to remove undesirable particulate material. Usually, the filtered beer would then be treated with a chill haze control agent by mixing such an agent with the filtered beer and allowing the combination to age for various periods of time. After the aging period the beer would again be filtered to remove the chill haze control agent and any matter adsorbed thereon.

In the present invention, one or more conventional chill haze control agents are included in a precoat layer or after precoat layer on the filter septum used to filter the ruh. In addition, one or more chill haze control agents are fed into the ruh prior to filtration, either alone or with a filter aid, as a body feed. As filtering progresses, the body feed mixed with the ruh is deposited on the surface of the precoat as the ruh passes through the precoat layer and is filtered. The filtered ruh can then be packaged immediately. Since the chill haze stabilization has been completed prior to the filtration of the ruh, the storage time normally needed for filtration to permit the conventional treatment used to eliminate chill haze and the second filtration step are eliminated.

While the above described method of stabilizing beer is adequate for many types of ruh, a preferred embodiment of the present invention requires the addition of one or more conventional chill haze control agents to the ruh during ruh storage, preferably after preliminary treatments in ruh storage, such as gelatin treatment, tannic acid addition, or krausening. In this embodiment the chill haze control agent or agents should be added after the above described preliminary treatments. Carbon dioxide gas washing can be done before, but preferably after, the addition of the haze control agent(s) to the ruh.

If the pH of the ruh is significantly below about four before the chill proofing agents are added to the ruh these agents may remove materials that would normally mask the effect that such a low pH would normally have on taste, thereby producing a beer having an undesirable taste. This problem can be corrected by adjusting the pH to above four, or to an optimum level based on taste tests. Of course, if the pH of the ruh is above about four prior to the addition of the chill haze control agent no effect on taste is encountered.

Although not preferred, one or more of a large number of chill haze control agents could be used in the present process. For example, typical chill haze control agents that could be used are a hectorite material such as that disclosed in U.S. Pat. No. 3,100,707, natural magnesium silicates such as those disclosed in U.S. Pat. No. 2,416,007, synthetic metal silicates such as those disclosed in U.S. Pat. No. 3,251,693, acid activated bentonites and further acid treated products thereof such as those disclosed in U.S. Pat. application Ser. No. 493,302, filed July 31, 1974, and polyvinyl pyrrolidone and polyvinyl polypyrrolidone such as those disclosed in U.S. Pat. Nos. 2,688,550; 2,811,449; 2,860,987; 2,875,062; 2,939,791; and 2,943,941. The preferred chill haze control agent for use in the present invention is an acid treated synthetic magnesium silicate containing less than about 14% magnesium oxide, of the type disclosed in U.S. Pat. application Ser. No. 502,267, filed Sept. 3, 1974, either alone, or as a member of a blend containing another chill haze control agent, such as polyvinyl polypyrrolidone, and optionally a filter aid, such as diatomite.

The following examples illustrate the present invention and the advantages deriving therefrom.

EXAMPLE 1

After the fermentation step in a commercial brewing process the ruh was allowed to rest in ruh storage for seven days and then was filtered through a layer of diatomite using a diatomite precoat and a diatomite addition upstream of the filter as body feed. Conventional enzymes were then added to the filtered ruh in a conventional manner and the thus treated ruh was allowed to rest for 48 hours at about 32°F after which the ruh was polished filtered through a precoat of diatomite and with a diatomite body feed. Properties of the resultant commercial product are shown in Table 1.

EXAMPLE 2

Following the primary filtration step in the process described in Example 1, a mixture of 85 weight percent acid washed synthetic magnesium silicate as described in U.S. Pat. application Ser. No. 502,267 and 15 weight percent polyvinyl polypyrrolidone was added to the filtered ruh at the rate of 4 pounds per 100 barrels of ruh. The thus treated ruh was allowed to rest for 48 hours at 32°F and was then polished filtered at described in Example 1. The properties of the resulting beer are provided in Table 1.

EXAMPLE 3

Immediately following the primary filtration step in the process described in Example 1, a mixture of 95 weight percent diatomite, 4.25 weight percent of the acid washed synthetic magnesium silicate described in Example 2, and .75 weight percent of polyvinyl polyprrolidone was added to the freshly filtered ruh at the rate of 12½ pounds per 100 barrels of ruh body feed. This mixture was then quickly filtered through a precoat layer made up of 80 weight percent diatomite, 15 weight percent cellulose fiber, 4.25 weight percent of the acid washed synthetic magnesium silicate described above, and 0.75 weight percent polyvinyl polypyrrolidone. The properties of the thus filtered beer are provided in Table 1.

TABLE 1

| Properties | Example 1 (Control) | Example 2 | Example 3 |
|---|---|---|---|
| PSASPL[1] Breakpoint (100 gms. ammonium sulphate in 200 ml. water) | 37.2 | 10.2 | 11.7 |
| Cyanogen value[2] | 94.7 | 98.1 | 85.1 |
| Anthocyanogen value[2] | 48.0 | 43.7 | 42 |
| Tanninogen value[2] | 142.7 | 141.8 | 127.1 |
| Turbidity after torture[3] (JTU at 72°F) | 1.8 | 1.6 | 1.8 |
| Turbidity after torture[3] (JTU at 31°F) | 2.3 | 2.55 | 3.4 |
| Taste | Control | Same as Control | Better than Control |

[1]Test is described in United States Patent Application S.N. 493,302 described above.
[2]Tests are described in "Analytical Methods for Polyphenols in Brewing: Parts 1–3, appearing in the 1971 issue of the AMERICAN SOCIETY OF BREWING CHEMISTRY at pages 149–70 and the 1972 issue at pages 50–56.
[3]Transporting in trunk of a car for about 300 miles over a two week period at temperatures ranging from 44–95°F. At the completion of the tests the beer was about 6 weeks old.

Example 1 above represents a convention commercial beer that has been stabilized against chill haze formation with a convention enzyme treatment. Example 2 above represents the same commercial beer except that this beer has been stabilized against haze formation by treatment with adsorbents for the haze forming molecules. The properties of the beers of Examples 1 and 2 are very similar except that the enzyme treated beer displays a much higher PSASPL breakpoint than the adsorbent treated beer. This is typical and is caused by the fact that enzymes are still present in the enzyme treated beer and continue to break down the haze forming molecules even after bottling whereas all of the adsorbents are removed by filtration in the Example 2 process and thus do not remain in the beer to continue to adsorb the haze forming molecules. Although a high PSASPL breakpoint is desirable, the presence of enzymes in the final beer is also considered detrimental or undesirable by many brewers.

A comparison of the results of Example 3 with those of Example 2 show that only a very short contact time is required with the adsorbent to remove the undesirable haze forming molecules. Although the turbidity at 31°F in Example 3 is higher than that of the control, it is still within acceptable limits. Based on these results it was decided to eliminate one of the filtration steps and to add the chill proofing agents to unfiltered ruh beer as body feed and then filter this mixture through a precoat layer containing chill proofing agents as described in Example 3.

EXAMPLES 4 – 6

In a commercial brewery four fermenter tanks of 825 barrels each were manifolded to empty simultaneously into three ruh tanks of 1,100 barrels each. The control ruh, in the first tank, was treated with gelatin at a dosage of 0.75 pounds per hundred barrels of ruh and with a conventional antioxidant at a dosage of 0.5 pounds per hundred barrels of ruh. The mixture was allowed to rest in ruh storage at 32°F for about 5 days. The thus treated ruh was then decanted from the ruh storage tank and filtered in a conventional manner using a conventional diatomite precoat and bodyfeed. Afterwards the primary filtered beer was given a conventional enzymatic chill proofing treatment, including a 96 hour resting period, polished filtered, and bottled. Processing data and some properties of the resultant control beer are reported in Table 2 as Example 4.

The ruh in the second ruh storage tank was treated at a rate of 4½ pounds per hundred barrels of ruh with a mixture of 85 weight percent acid washed synthetic magnesium silicate as described in Ser. No. 502,267 and 15 weight percent polyvinyl polypyrrolidone. This mixture of ruh and adsorbents was then gas washed for 36 hours with carbon dioxide and then allowed to rest for about 3½ days at 32°F. Following resting, the ruh was decanted and filtered at 31°F through a 476 sq. foot horizontal tank, vertical leaf, Enzynger filter using 100 pounds of precoat consisting of 80 weight percent diatomite, 15 weight percent cellulose fiber, 4.25 weight percent acid washed synthetic magnesium silicate as described above, and 0.75 weight percent polyvinyl polypyrrolidone. The thus filtered beer was immediately bottled. Processing data and some properties of this beer are reported in Table 2 as Example 5.

The same amount and type of adsorbents were added to the third tank of ruh as were added to the second tank of ruh, Example 5, but the gas washing step was eliminated. The third tank of ruh was allowed to rest for about 5 days and was filtered through the same precoat and in the same manner and at the same temperature as described in Example 5 immediately following the completion of the filtration of the second tank of ruh. The filtered beer was immediately bottled. The processing data properties of the bottled beer are shown in Table 2 as Example 6.

TABLE II

| Process and Product Data | Example 4 (Control) | Example 5 | Example 6 |
|---|---|---|---|
| Properties of initial ruh: | | | |
| pH | 3.98 | 3.98 | 3.98 |
| Balling | 2.35 | 2.35 | 2.35 |
| Protein (%) | 0.25 | 0.25 | 0.25 |
| Amino Nitrogen (ppm) | 24 | 24 | 24 |
| Diacetyl (ppm) | 0.126 | 0.126 | 0.126 |
| Differential Pressure Across the Filter Precoat (psi) | | | |
| After 1100 gallons | | 3 | |
| After 2200 gallons | 12 | | 4 |
| Turbidity of Filtered Beer (Nephlo Turbidity Units) | | | |
| After carbonation | 16 | 16 | 17 |
| After 24 hours | 18 | 13.5–14 | 13–14 |
| Ruh Tank Sediment thickness (inches) | 1 | 0.5 | 0.5 |
| Taste (Brewers Taste Panel) | Control | Better than Control | Same as Control |

As shown by the differential pressure data and turbidity data in Table II, the use of chill haze stabilizes in the ruh, in the bodyfeed, and in the precoat resulted in better filtration efficiency and effectiveness than straight diatomite filtration in the conventional control process, and required only one filtration step in contrast to the two filtration steps required in the control process. This means significant cost reductions to the brewer in terms of reduced processing time, longer precoat life, reduction in required processing equipment and space, and a reduction in energy requirements.

The ageing tests had not yet been completed at the time this application was written, but the improved turbidity properties in the bottled beer stabilized according to the present invention indicate adequate chill haze stability. The taste data in Table II also indicate that the gas washing step should preferably be started after the addition of the chill haze control agents to the ruh.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead to be limited only by the claims appended hereto.

I claim:

1. In a method of treating a liquid derived from one or more vegetables or fruits to reduce the tendency of chill haze formation in said liquid, said method including a filtration step and the addition of one or more chill haze control agents, the improvement comprising including in a precoat or after precoat layer in the filter media used in said filtration step at least one chill haze control agent, and adding at least one chill haze control agent as body feed to said liquid prior to said filtration step, said chill haze control agents being selected from the group comprising hectorite, acid activated bentonite, acid treated acid activated bentonite, polyvinyl pyrrolidone, polyvinyl polypyrrolidone, natural magnesium silicates, synthetic metal silicates, and acid treated synthetic magnesium silicates containing less than 14 wt. percent MgO.

2. A method as defined in claim 1 wherein said at least one chill haze control agent comprises a mixture of polyvinyl polypyrrolidone and an acid treated synthetic magnesium silicate having a magnesium oxide content of less than 14 wt. percent.

3. A method as defined in claim 2 wherein said liquid is a ruh beer.

4. A method as defined in claim 3 wherein a conventional particulate filter aid is included in said mixture.

5. A method as defined in claim 4 wherein at least one chill haze control agent is also added to the ruh in ruh storage prior to filtration.

6. A method as defined in claim 5 wherein the pH of the ruh is measured, and if the pH is significantly below about 4, the pH of the beer is increased to about 4 prior to packaging.

* * * * *